(12) United States Patent
Robinson

(10) Patent No.: US 10,179,684 B2
(45) Date of Patent: Jan. 15, 2019

(54) BALING STRAP

(71) Applicant: D R BALING WIRE MANUFACTURERS LIMITED, Sheffield, South Yorkshire (GB)

(72) Inventor: Peter James Robinson, Sheffield (GB)

(73) Assignee: D R BALING WIRE MANUFACTURERS LTD (GB)

( * ) Notice: Subject to any disclaimer, the term of this patent is extended or adjusted under 35 U.S.C. 154(b) by 394 days.

(21) Appl. No.: 14/677,729

(22) Filed: Apr. 2, 2015

(65) Prior Publication Data

US 2016/0272392 A1 Sep. 22, 2016

(30) Foreign Application Priority Data

Mar. 19, 2015 (GB) .................................. 1504672.5

(51) Int. Cl.
| | | |
|---|---|---|
| *B65D 71/00* | (2006.01) | |
| *B65D 71/02* | (2006.01) | |
| *B65D 71/06* | (2006.01) | |
| *B29C 59/04* | (2006.01) | |
| *B29C 47/00* | (2006.01) | |
| *B65D 85/07* | (2017.01) | |
| *B29C 47/08* | (2006.01) | |

(52) U.S. Cl.
CPC ............ *B65D 71/06* (2013.01); *B29C 59/043* (2013.01); *B65D 71/02* (2013.01); *B65D 85/07* (2018.01); *B29C 47/0898* (2013.01)

(58) Field of Classification Search
CPC ........ B65D 71/06; B65D 71/02; B65D 85/16; B65D 75/02; B32B 3/30; Y10T 428/24479; Y10T 428/24488; Y10T 428/24008; B29C 59/043; B29C 47/0061

USPC .................................. 24/16 PB, 17 AP, 16 R
See application file for complete search history.

(56) References Cited

U.S. PATENT DOCUMENTS

| | | |
|---|---|---|
| 3,137,990 A | 6/1964 | Carranza |
| 3,315,454 A | 4/1967 | Carranza |
| 3,332,228 A | 7/1967 | Chill |
| 3,668,740 A * | 6/1972 | Pearson ............... B29C 70/347 24/16 PB |

(Continued)

FOREIGN PATENT DOCUMENTS

| | | |
|---|---|---|
| CA | 729930 | 3/1966 |
| CN | 201362431 | 12/2009 |

(Continued)

OTHER PUBLICATIONS http://www.great-pruning-products.com/deltex.html.

*Primary Examiner* — Joanna Pleszcynska
(74) *Attorney, Agent, or Firm* — Clark Hill PLC; James R. Foley

(57) ABSTRACT

A thermoplastic baling strip comprises an elongate band of thermoplastic material said elongate band having sufficient flexibility to be formed into a knot; the elongate band having an outer surface formed with a set of surface undulations extending along its main length. The plurality of surface undulations operate in use to grip a surface to which said strip surface contacts. The use of undulations extending along the length of the strip enable the strip to be reliably tied in a knot, without releasing or coming undone when transported. Complete bales can be fed into an incinerator without the need to remove the baling strip, which burns on incineration.

22 Claims, 12 Drawing Sheets

(56) References Cited

U.S. PATENT DOCUMENTS

| | | | |
|---|---|---|---|
| 3,780,401 A | 12/1973 | Reimer | |
| 3,914,823 A * | 10/1975 | Hara | B65D 63/1018 |
| | | | 24/16 PB |
| 4,152,475 A * | 5/1979 | Haley | B29C 53/265 |
| | | | 24/16 PB |
| 6,168,337 B1 * | 1/2001 | Adams | B42F 13/06 |
| | | | 24/16 PB |
| 6,179,178 B1 * | 1/2001 | Stegmeyer | A45C 13/30 |
| | | | 224/257 |
| 6,763,556 B2 * | 7/2004 | Fagan | A44B 18/0053 |
| | | | 24/452 |
| 7,118,648 B2 | 10/2006 | Dever et al. | |
| 8,015,671 B2 * | 9/2011 | Pearson | B29C 47/0038 |
| | | | 24/1 |
| 2002/0170155 A1 | 11/2002 | Shilale | |
| 2007/0186388 A1 | 8/2007 | Rome | |
| 2010/0146743 A1 | 6/2010 | Rome | |

FOREIGN PATENT DOCUMENTS

| | | |
|---|---|---|
| CN | 103910931 | 7/2014 |
| EP | 1 704 987 | 9/2006 |
| FR | 2 563 200 | 10/1985 |
| GB | 1092178 | 11/1967 |
| GB | 2510985 | 8/2014 |
| WO | 03/023928 | 3/2003 |
| WO | 03023928 | 3/2003 |

\* cited by examiner

BALING STRAP

FIELD

The present invention relates to an improved baling strap, and to a method and apparatus for manufacture thereof.

BACKGROUND

The disposal of refuse waste from commercial and domestic premises is an ongoing problem in many countries. In the United Kingdom, around 85% of household waste is recycled, and around 15% goes to landfill. In major cities such as London it is increasingly difficult to find landfill sites, since many of the disused quarries around the cities are now full to capacity with waste. Further, there are increasingly stringent regulations concerning the proportions of waste which must be recycled. Governments and local authorities are increasingly discouraging the use of landfill by increasing taxes on waste sent to landfill, which are currently around £80 per tonne in the United Kingdom.

In United Kingdom, around 4 to 5 million tonnes of refuse waste is incinerated each year in the form of refuse derived fuel (RDF). Around 15% of this RDF is shipped out to the Netherlands for incineration to generate electrical power. The transportation of bulk RDF causes increased $CO_2$ emissions as well as being expensive.

The RDF is packed into bales which are compressed and held together with wire straps and covered in plastic in order to contain smells from food waste and other waste constituents, and also to keep the moisture content of the RDF stable during storage and transportation. Ingress of water into bales during storage and transportation increases the weight of the bales and also reduces the combustion efficiency of the RDF at its final destination of incineration. During storage and transport, bales of RDF can stand in the open exposed to the environment for up to 2 months before they are finally incinerated.

To reduce volume for transport and storage, the RDF is compressed into bales under a force of around 100 tonnes. A problem with known bales of RDF wrapped in steel wire is that the steel wire needs to be cut to recover the steel wire, prior to incineration of the RDF, both to recycle the steel wire, and to prevent the steel wire damaging and/or reducing the efficiency of the incinerator. When the wire is cut, the bales unfold and expand over a large area. The released RDF is then pushed into an incinerator using a bulldozer or similar mechanical handling equipment.

The use of metal wire for producing bales of RDF allows for high compression of bales and for efficient transport of the bales without the bales coming apart. However the unwrapping of the bales prior to incineration and loading into an incinerator using a bulldozer or other mechanical handling equipment means that the bales revert to loose RDF at their final destination immediately prior to incineration. It is difficult to control the burn rate of incinerators by feeding in loose RDF, since the quantity of RDF fed into the incinerator is difficult to control and consequently the rate of production of power at RDF burning power stations has limits on its controllability.

SUMMARY

It would be an advantage if complete bales of RDF could be fed directly into incinerators, rather than having to break open the RDF bales to give loose RDF to feed into an incinerator.

Specific embodiments aim to provide a means of baling up refuse derived fuel without the use of metal straps or bands, so that the bales can be fed directly into an incinerator without the need to open the bales prior to incineration.

According to a first aspect, there is provided a thermoplastic strap, comprising:
a flexible elongate band of thermoplastic material;
said elongate band having an outer surface formed with a set of surface undulations extending along a main length of said elongate band;
said plurality of surface undulations providing said elongate band with a gripping surface.

Preferably said strap comprises a first set of surface undulations extending along a first surface of said elongate band; a second set of surface undulations extending along a second surface of said elongate band; wherein said first and second surfaces are on opposite sides of said elongate band.

Preferably said first and second sets of surface undulations are spaced apart from each other around a circumference of said elongate band.

Said surface undulations may comprise ribbed undulations extending in a direction transverse to a main length of said elongate band.

Preferably said strap is self-locking with itself to form a knot, such that the strap can be tied around a bale and knotted with itself in a secure manner.

In use, a plurality of surface undulations of one part of the strap grip a surface of another part of the strap, when the strap is knotted with itself. Alternatively, the surface undulations of the strap may grip the surface of another strap to which the strap is tied in a knot with.

The undulations preferably comprise a plurality of protruding portions and a plurality of recessed portions. The protruding portions in the best mode comprise a plurality of ridges or ribs. The recessed portions in the best mode comprise a plurality of valleys.

Where the undulations comprise a plurality of alternating ridges and valleys, the ridges may have a shape along their length, being either a straight line straight line, a "V" shape, a chevron shape, and "S" shape, a "C" shape, or a shallow curve.

Typically, the ribs in a set of ribs may be spaced apart at a distance of 8 to 12 ribs per centimeter (1.25 to 0.83 ribs per millimeter), along the length of the elongate strap.

In other embodiments, the protrusions may be discrete stud type protrusions, in the form of hemispherical mounts, or 3 sided or 4 sided pyramids.

The sets of undulations may extend lengthwise along the strap in straight lines, or in a double or multiple helix running around the circumference of the elongate strap.

Preferably the strap is made of a synthetic thermoplastic material. Material may be selected from the set:
polypropylene;
poly acrylic nitrile;
short fibre reinforced polymer;
polyethylene terephthalate.

According to a second aspect there is provided an apparatus for manufacture of an extruded bailing strip, said strip comprising:
an elongate band of thermoplastic material, said elongate band having sufficient flexibility to be formed into a knot;
said elongate band having an outer surface formed with a set of surface undulations extending along main length of said elongate band;
said apparatus comprising:
a feed roller for holding a supply thermoplastic cable;
a heating chamber for heating said thermoplastic cable;

an extrusion die for extruding said thermoplastic cable into an extruded strip; and a set of one or more impression rollers for applying a set of undulations to an outer surface of said extruded strip.

According to a third aspect there is provided a method of manufacture of a thermoplastic strip, said strip comprising:

an elongate band of thermoplastic material;

said elongate band having an outer surface formed with a set of surface undulations extending along a main length of said elongate band said method comprising:

extruding an elongate band of said thermoplastic material;

passing said extruded elongate band, through a set of rollers, said rollers having a surface comprising a plurality of undulations, so as to impress on said elongate band said set of surface undulations.

Other aspects are as set cut in the claims herein.

BRIEF DESCRIPTION OF THE DRAWINGS

For a better understanding and to show how the same may be carried into effect, there will now be described by way of example only, specific embodiments, methods and processes with reference to the accompanying drawings in which.

DETAILED DESCRIPTION OF THE EMBODIMENTS

There will now be described by way of example a best mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

In this specification, the terms "cable", "wire", "strap", and "band" are used interchangeably to denote an elongate flexible member made from any one of a range of materials including but not limited to, metals, and/or plastics materials and/or thermoplastics material.

Figure 1:
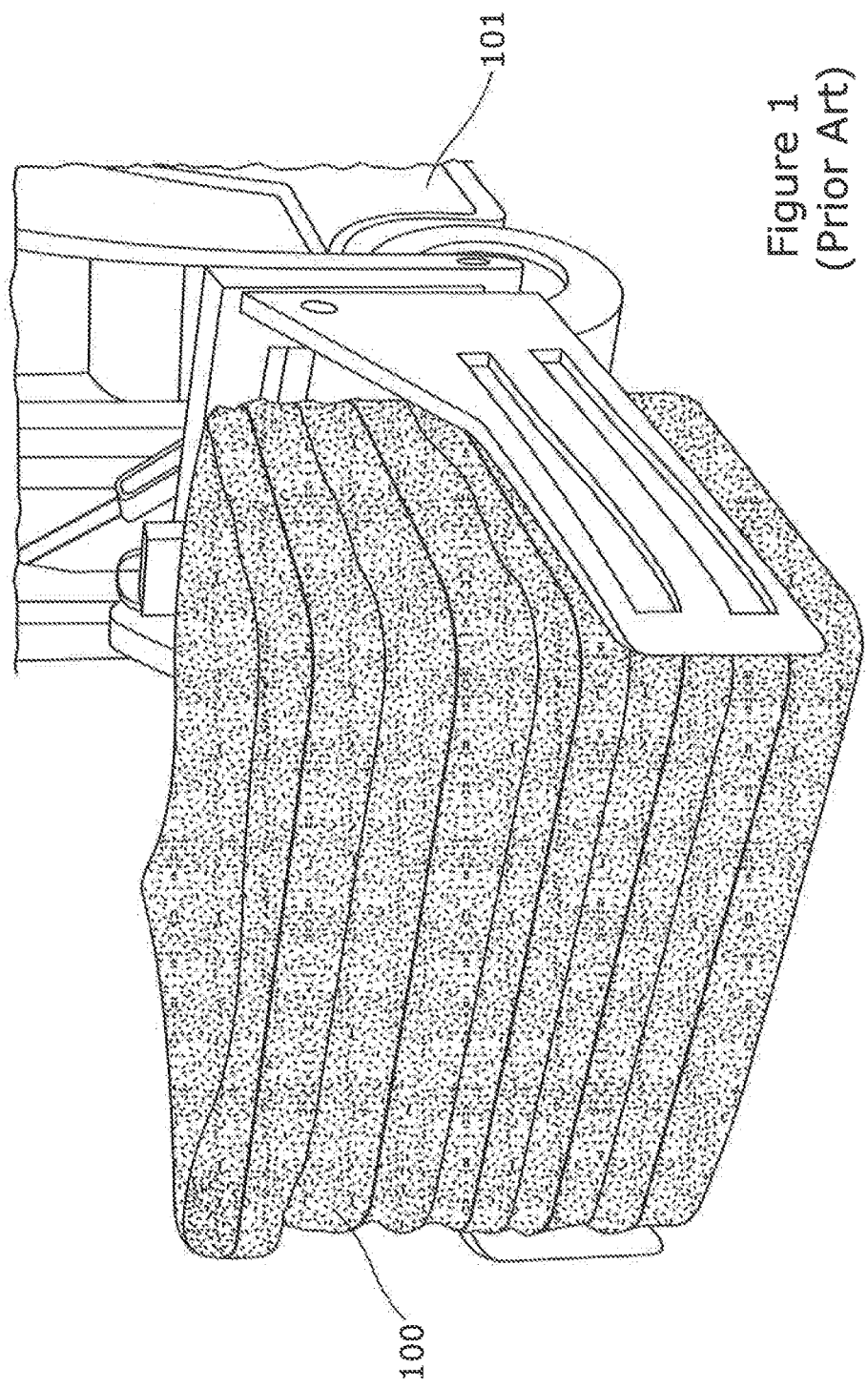
FIG. 1 herein illustrates schematically a conventional RDF bale, compressed and wrapped with steel wire.

Referring to FIG. 1 herein, there is illustrated schematically a known bale of refuse derived fuel (RDF) 100 together with a mechanical handling equipment (MHE) in the form of a lift truck 101 having an attachment for handling the bale of RDF. Known bales of RDF can be rectangular or cylindrical. In the case of rectangular bales, a typical size may be of dimensions width 2 m, height 1.5 m, depth 1.5 m, although a wide range of bale dimensions are possible.

As shown in FIG. 1, a known RDF bale may be manipulated by a lift truck by picking up the bale between a pair of horizontally extending arms of the lift truck, and manoeuvring the bale using the lift truck. The known RDF bale is compressed in a baling machine, and wrapped with a plurality of metal straps which hold the compressed bales together. Typically the known metal straps are made of stainless steel. Each bale may have between 4 and 8 metal straps, depending upon the size of bale.

Known RDF bales are produced in a bale making machine which compresses refuse material under a ram force of up to 120 tonnes. The weight of the bale depends upon the amount of material compressed, the higher the compressive force, the greater the amount of material that can be compressed into a bale of a given size. Typically, for a bale size of 1300 mm length by 1150 mm width by 780 mm height, compressed at a ram force of 120 tonnes, the RDF bale weight may be up to 950 kg. Reducing the ram force to 80 tonnes may reduce the amount of material compressed, giving an RDF bale weight of up to 900 tonnes. Reducing further the ram force to 60 tonnes for a bale of the same dimensions, may give an RDF bale weight of up to 800 kg.

The specific pressure on the movable plate compressing the refuse waste into a bale may be up to 152 tonnes/m$^3$.

Figure 2:
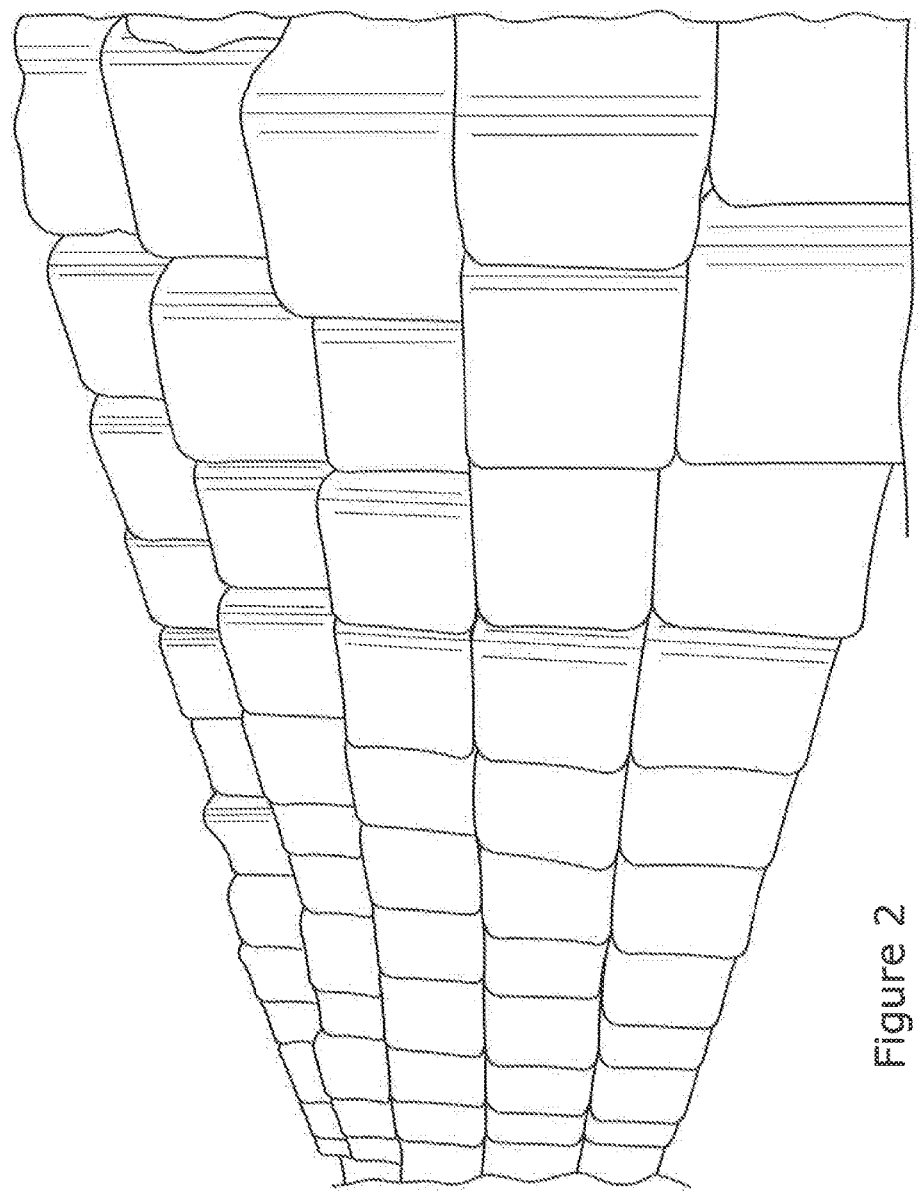
FIG. 2 herein illustrates schematically a pile of plastic wrapped wire bound RDF bales placed out in open storage.

Referring to FIG. 2 herein, there is illustrated schematically a pile of RDF bales, held together with metal straps, and which have been wrapped in a plastics sheet material to keep out moisture and rain, and to prevent small pieces of RDF from dropping off the bales during transit. Once the bales of been manufactured, it is important that the bales do not absorb any further moisture, since this increases their weight and makes them more difficult to handle, as well as requiring more energy for their transportation and therefore incurring greater $CO_2$ generation in their handling and transport. Further, absorbing moisture reduces the burn efficiency of the RDF at the time of incineration.

The metal straps prevent the bale from coming apart during storage, transit or handling. The outer plastic wrap by itself is not strong enough to prevent the bale from coming apart. If one or more straps break during storage, handling or transit and the bale comes apart, this is highly disruptive and inefficient. Due to the relentless ongoing rate of refuse generation, bailed RDF must be kept moving efficiently throughout the waste disposal transportation, storage and incineration systems in order to keep up with the rate at which the human populated generate refuse. Therefore, the metal straps need to be strong and reliable enough not to come apart during storage, handling or transit of the bales.

Figure 3:
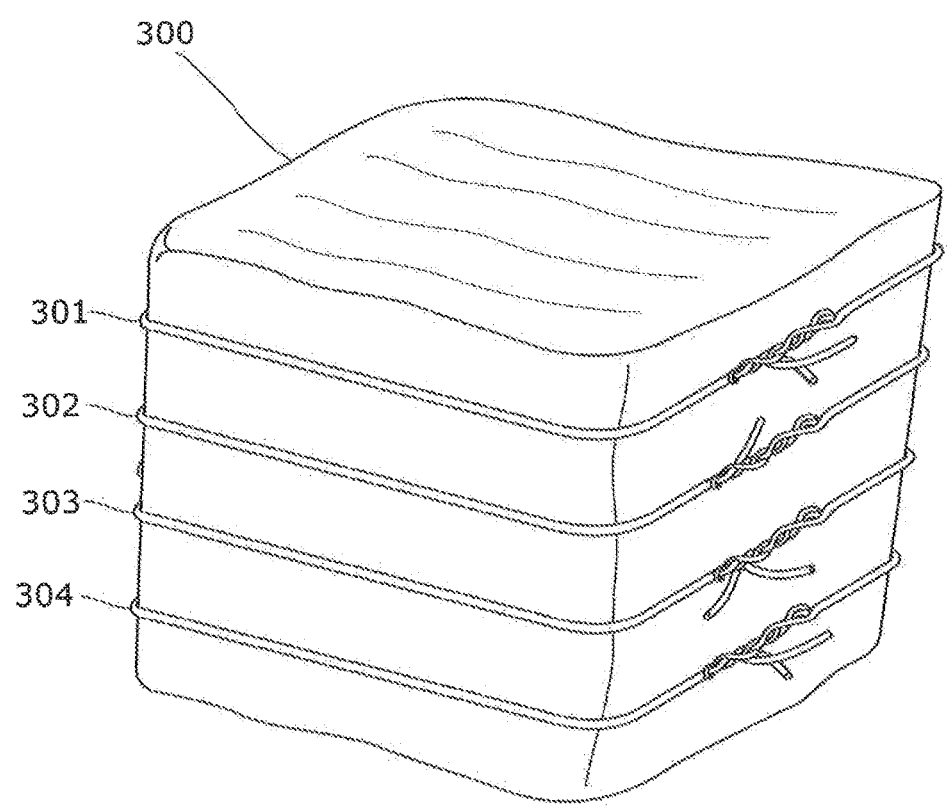
FIG. 3 herein illustrates schematically an RDF bale bound by a set of novel baling strips according to a specific embodiment.

Referring to FIG. 3 herein, there is illustrated schematically an RDF bale bound by a plurality of straps (301-304) according to a specific embodiment. Each strap comprises an elongate band of plastics material. Each strap extends around the bale, and the two ends of the strap are tied together in a knot (305-308), so that the strap is tied to itself.

The example bale shown is tied together with 4 straps, although the number of straps which each bale can be tied with can be varied. In the example shown, since the bale exerts a force on the straps, each strap must be capable of withstanding at least the outward expanding force of the bale force divided by the number of straps holding the bale.

The plastics straps are flexible enough that they may be twisted together similarly to metal wire to form knots which tie the two ends of the strap together. As with the prior art metal baling straps, it is important that the novel baling strips disclosed herein do not break during normal storage, handling or transit of bales. In particular, it is important that the knots tying the two ends of a strip around a bale not disentangle so that the knot comes apart.

Figure 4:
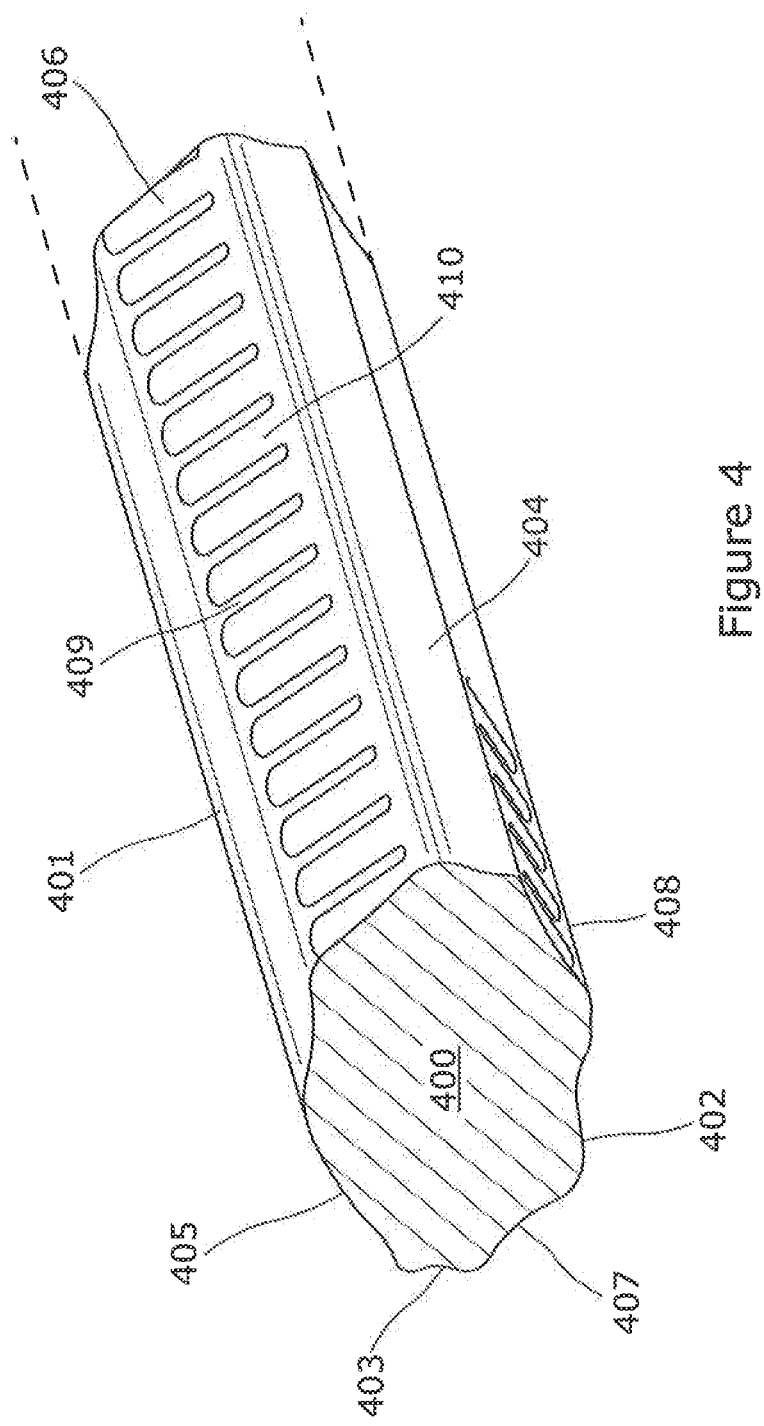
FIG. 4 herein illustrates schematically in perspective cutaway view a length of novel baling strip according to a first specific embodiment.

Referring to FIG. 4 herein, there is illustrated schematically a length of the elongate strap of FIG. 3. The strap comprises an elongate body 400 having upper and lower opposing faces 401, 402; first and second sides 403, 404 respectively; first and second upper angled surfaces 405, 406 respectively; and first and second lower surfaces 407, 408 respectively. Said upper and lower opposing faces 401, 402 each occupy a respective upper and lower plane, said upper and lower planes being parallel to each other. Said first and second sides 403, 404 each occupy a corresponding respective first and second outer plane, said first and second outer planes being substantially parallel to each other and spaced apart from each other. First angled upper surface 405 coincides with a first angled plane. Second angled surface 406 coincides with the second angled plane. Third angled surface 407 coincides with a third angled plane, and fourth angled surface 408 coincides with the fourth angled plane.

The first angled plane bisects each of the upper and lower planes at an angle in the range 35° to 55°. The second angled plane bisects each of the upper and lower planes at an angle in the range 35° to 55°. Similarly, the third angled plane bisects each of the upper and lower planes at an angle in the range 35° to 55°, and the fourth angled surface bisects each of the upper and lower planes at an angle in the range 35° to 55°.

The elongate body is extruded from polyethylene terephthalate (PET). The flexibility of the elongate body can be varied by varying the tension of extrusion of polyethylene terephthalate through a die of an extrusion machine during manufacture.

Each of the first to fourth angled surfaces comprises a plurality of undulations in the form of a plurality of ridges 409 and valleys 410, said ridges extending in a direction parallel to the corresponding respective angled plane, and transverse to a main length direction of the elongate strap.

The first set of undulations extending lengthwise along the elongate body, occupies a first part of the circumference of the body as viewed in a direction perpendicular to the main length axis of the body. The second set of undulations occupies a second part of the circumference of the body, the second set of undulations being spaced apart from the first set of undulations around the perimeter of the elongate body, and also extending lengthwise along the elongate body. The third set of undulations occupies a third part of the circumference of the body, spaced apart from the second set of undulations around the perimeter of the elongate body, and spaced apart from the third set of undulations, and extending along a length of the elongate body. The fourth set of undulations occupies a fourth part of the circumference of the body, and lies between and spaced apart from the first set of undulations and the third set of undulations, and extends along a length of the elongate body. The first to fourth sets of undulations are arranged around and surrounding the main centre line of the elongate body.

Between the first set of undulations and the second set of undulations there is a relatively smooth first surface extending along a length of strap. Between the second set of undulations and the third set of undulations, there is a second relatively smooth surface extending along a main length of the strap. Between the third set of undulations in the fourth set of undulations there is a third relatively smooth surface extending along a length of the strap. Between the fourth set of undulations and the first set of undulations there is a fourth relatively smooth outer surface extending along the length of the strap. Hence, around the circumference of the strap there are a plurality of alternating undulating surfaces and a plurality of relatively smooth surfaces.

As viewed in a direction perpendicular to the outer surface of the strip, the ridges and alternating valleys of the undulations may each form a substantially straight line extending in a direction normal to the main length axis of the elongate body. However in other embodiments, the ridges may be positioned at a transverse angle other than 90° compared to the main length axis of the elongate body.

Figure 5:
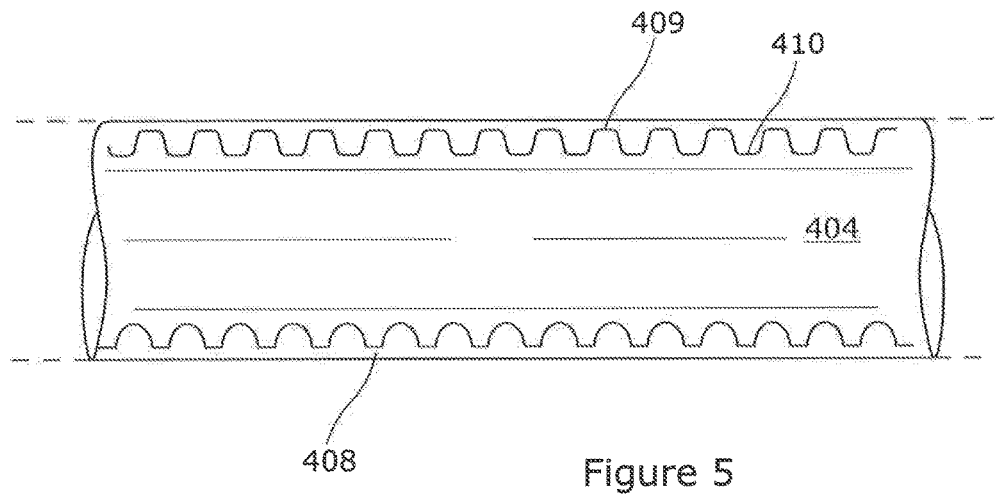
FIG. 5 herein illustrates schematically the length of baling strip of FIG. 4 herein in view from one side.

As viewed in a direction along a length of the ridges and valleys, in cross sectional view, the shape of the ridges and valleys along their lengths may be any of the following shapes:

alternating "V" shape valleys and inverted "V" shape ridges;
alternating "U" shaped valleys and "U" shaped ridges;
alternating "U" shaped valleys and "V" shaped ridges;
alternating square or rectangular shape valleys and square or rectangular ridges;

FIG. 5 herein shows a length of the elongate strap in view from one side. The view from the other side of the strap corresponds to that shown in FIG. 5, the strap being symmetrical (or at least substantially symmetrical) about a central plane perpendicular to the upper and lower planes, and bisecting the elongate body, said being symmetrical about another central plane bisecting the first central plane and being parallel to said first and second outer planes.

Figure 6:
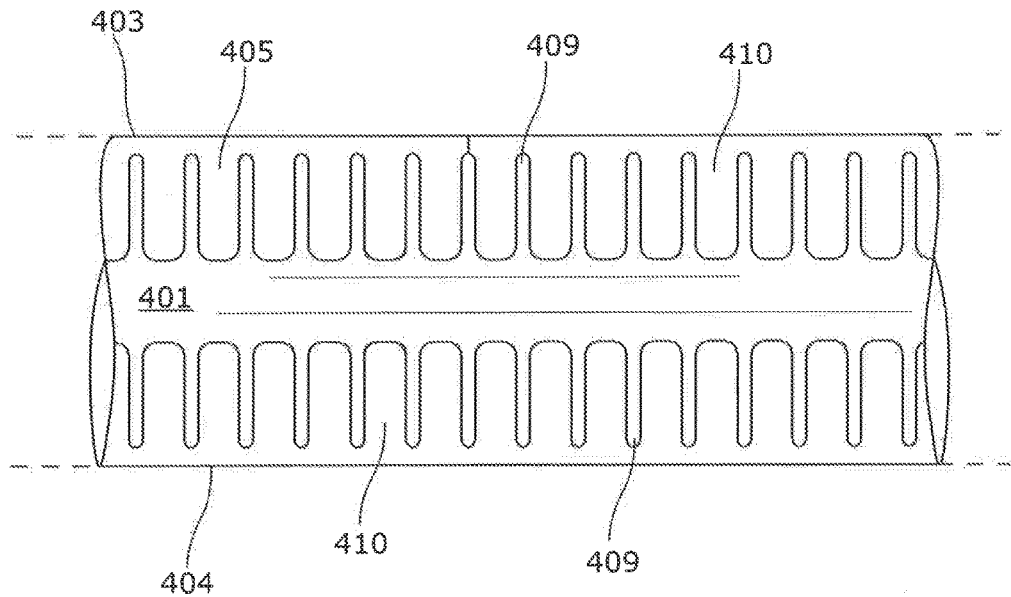
FIG. 6 herein illustrates schematically the length of baling strip of FIG. 4 herein in view from above.

FIG. 6 herein shows the length of elongate strap in plan view. The view from underneath corresponds to the view in FIG. 6, since the elongate strap is symmetrical (or at least substantially symmetrical) about said first central plane passing through the centre of the body and parallel to the upper and lower planes.

The elongate strap may be manufactured by extruding a length of thermoplastic material, for example polyethylene terephthalate through a shaped die, to produce a substantially rectangular cross-sectional elongate body, the elongate body being passed through a set of 4 opposing rollers having their axes of rotation at an angle in the range 35° to 55° relative to the sides of the rectangular cross-section. Each roller is impressed with a set of ridges and valleys, similarly to a gear wheel, so that as the elongate strap is pulled through the set of rollers under tension, the rollers impress the ridges and valleys of the first to fourth angled surfaces.

Alternatively, the outer profile of the elongate strip of extruded material may be formed by pressing a heated strip of thermoplastic material between a pair of oppositely facing rollers, each roller being in the shape of one half of the final strap cross sectional shape, and having angled surfaces corresponding to the undulating surfaces impressed with a three-dimensional surface pattern corresponding to the ridges and valleys to be formed on the extruded strip of thermoplastic material.

Figure 7:
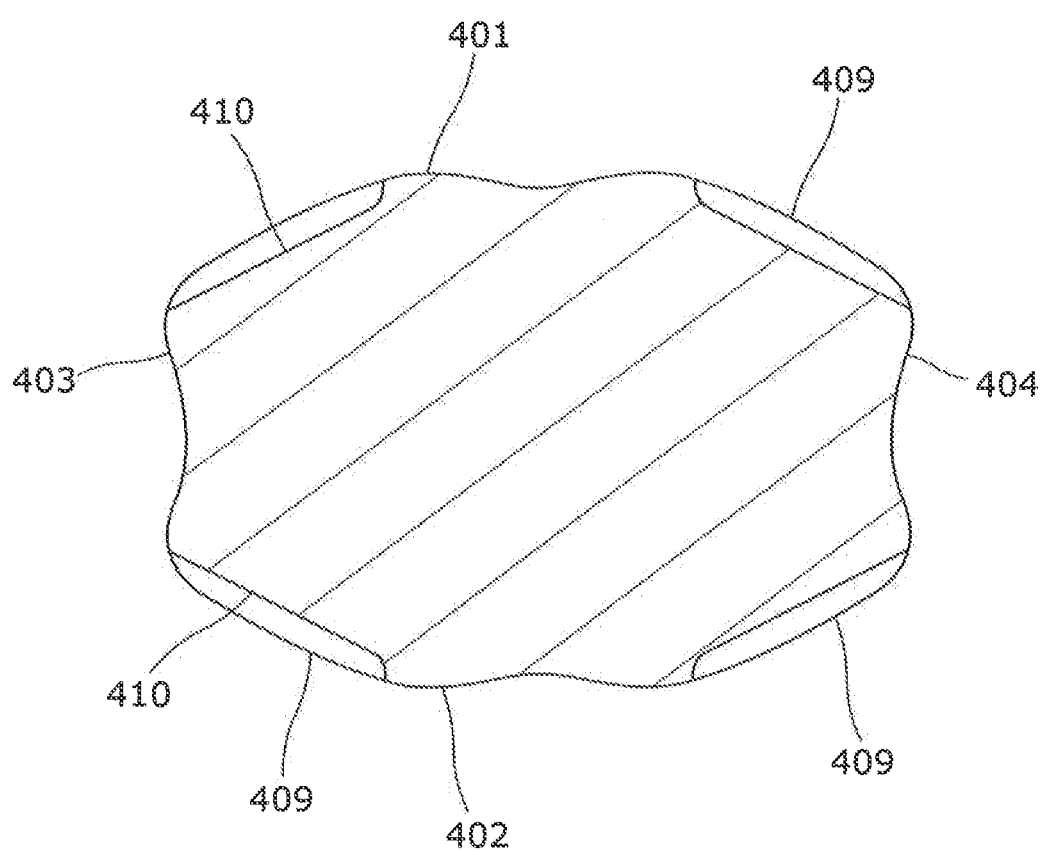
FIG. 7 herein illustrates schematically the length of baling strip of FIG. 4 in cutaway view as viewed along a main length axis of the strip.

Referring to FIG. 7 herein, there is shown schematically the length of elongate strap shown in cutaway view as viewed along a main length direction of the elongate strap. Formation of the ridges and valleys 409, 410 causes deformation of the upper and lower relatively smoother surfaces 401, 402 and the first and second relatively smoother side surfaces 403, 404 to give these a slight concave curved profile in the centre of each surface, each central concave curved surface being bounded by a pair of outer slightly convex surfaces.

Figure 8:
FIG. 8 herein shows the first embodiment baling strip of FIG. 4 tied into a knot.

In the best mode embodiment, the elongate strap has dimensions as follows:

Width: 3 mm to 8 mm
Breadth: 2 mm to 6 mm
Cross-sectional area in a direction perpendicular to the main length of the strap: 6 mm² to 48 mm²
Angle of angled surfaces relative to upper and lower surfaces: 35° to 55°.
Length of elongate ridges: 25% to 35% of width dimension
Length of valleys: 25% to 35% of width dimension
Height of ridges above valleys 0.2 mm to 1 mm
Number of ridges per unit length: 8 to 12 per cm
Undulations per millimeter of strip length: 0.83 to 1.25 per set Referring to FIG. 8 herein, there is illustrated schematically a length of the first embodiment baling strap as described with reference to FIGS. 4 to 7 herein, tied into a knot. The material of the strip is flexible enough that the strip may be wrapped or twisted around itself, and formed into a wide range of knots under applied tension. The extruded strip is flexible enough that it can be folded back on itself 180°, or formed into a 360° having radius in the range 5 mm to 8 mm, without cracking.

Once the knot is formed, and the compression from the baling machine is removed, due to the undulations on the outer surface of the strip, together with shape memory the strip once it has been placed under tension in a knot, the strip retains its knot shape. When tied around the bale, the knot remains under tension from the expansive force of the bale. Therefore it is important that the knot does not unwind or come undone after tying the knot, or when the forces used to tie the knot have been relaxed.

In the best mode embodiments, the externally facing undulations prevent adjacent parts of the strip within the knot from slipping with respect to each other. The undulations of one part of the strip, contact with the outer surface of another part of the length of the strip. The undulations act to grip an adjacent surface when the strap is knotted. The adjacent surface can either be a relatively smooth surface of the strap or another similar strap, or a part of the surface of the strap or another strap having undulations. The undulations may engage with each other and prevent movement of the elongate strip in an axial direction, and therefore prevent the knot from unfastening. When the knot is formed under tension, the undulations on the surface of the elongate strap may bite into an adjacent surface of another section of the strap, causing the strap to be locked tightly in the knot.

Figure 9:
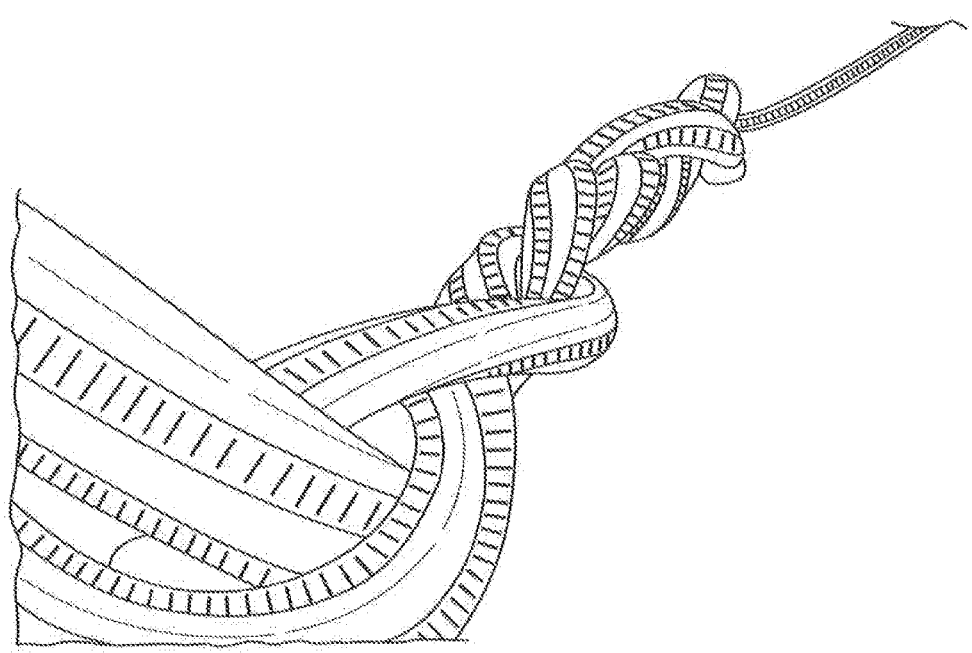
FIG. 9 herein shows another length of the first embodiment baling strip of FIG. 4 herein, tied to itself in another knot.

Referring to FIG. 9 herein, there is illustrated schematically in perspective view two ends of a single length of baling strap as described herein with reference to the first embodiment, twisted together to form a crude knot. As can be seen in FIG. 9 when formed into a knot, the baling strap experiences twisting about its main length axis; twisting of one part of the strap around another part, with a radius of curvature comparable to the radius of curvature around the perimeter of the elongate body; and the outer facing undulations of one part of the length of the strap are in contact with the outer facing undulations of another length part of the strap, so that outwardly facing undulations come into contact with each other and engage each other. The undulations may engage each other such that the plurality of ribs contact each other and the ribs and valleys of one set of undulations engaging with the ribs and valleys of another set of undulations, or another part of the same set of undulations. In the general case, it is more likely that the ribs and valleys will be misaligned, so that the ridges of one set of undulations lie across and at an angle to the main ridges of the other set of undulations, although in some parts of the knot, one set of ribs and valleys may engage in the same direction with another set of ribs and valleys of an adjacent part of the knotted elongate strap.

Figure 10:
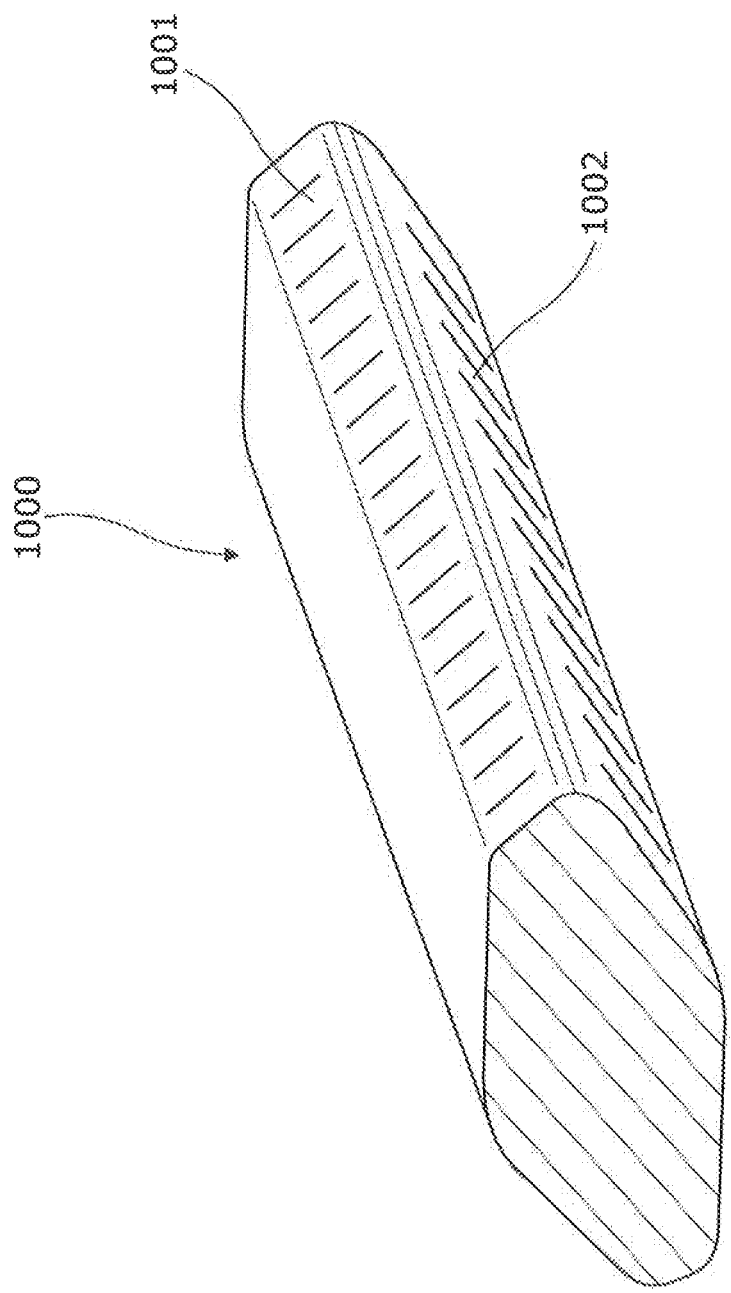
FIG. 10 herein illustrates schematically a length of a second baling strip according to a second specific embodiment, in perspective view.

Referring to FIG. 10 herein, there is illustrated schematically in perspective view, part of a length of a second baling strip 1000 according to a second specific embodiment. The second baling strap comprises an elongate body of thermoplastic material, preferably polyethylene terephthalate, formed by extrusion into a substantially rhomboid shaped cross-section as viewed in a direction along a main length axis of the elongate strap; around the outer perimeter of the elongate body being formed a plurality of sets of undulations 1001, 1002 each of which extend along a main length of the elongate body. In the embodiment shown, each set of undulations comprises a set of ribs, each rib having its main length axis extending transverse to a main length direction of the elongate strap and lying around a perimeter of the elongate body in a plane transverse to the main length of the strap. Preferably, each set of undulations has between 8 and 15 ribs per centimeter of strap length, with corresponding intervening valleys or troughs, as measured along the main length direction of the elongate body.

Figure 11:
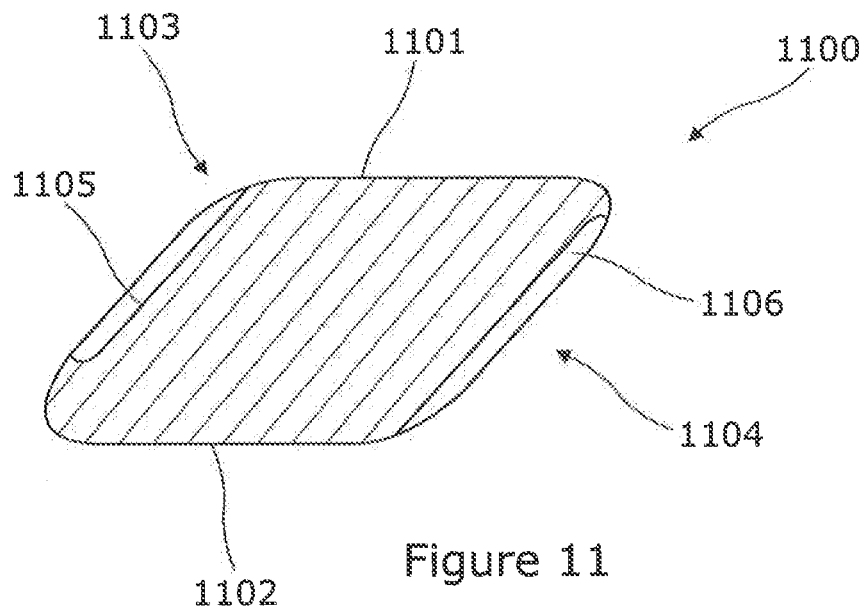
FIG. 11 herein shows in cutaway view along a main length axis, a third baling strip according to a third specific embodiment.

Referring to FIG. 11 herein, there is illustrated schematically in cutaway view in a direction along a main length axis, a third baling strip according to a third specific embodiment.

The third baling strip 1100 has a cross-sectional shape in the form of a rhomboid having four main sides, with two relatively longer sides 1101, 1102 and two relatively shorter sides 1103, 1104. On a first relatively shorter side 1103 there is provided extending along a main length of the elongate strip a set of undulating alternating ridges and troughs 1105. Similarly, on the second relatively shorter side 1104, on an opposite side of the main elongate body to the first relatively shorter side 1103 there is provided a second set of alternating ridges and valleys 1106 extending along a main length of the elongate body.

As described herein before with reference to the first specific embodiment, the troughs and valleys may be provided in the form of alternating ribs, or ridges and valleys extending along a length of the elongate body, and separated around a perimeter of the elongate strap by elongate relatively smooth surface portions.

Figure 12:
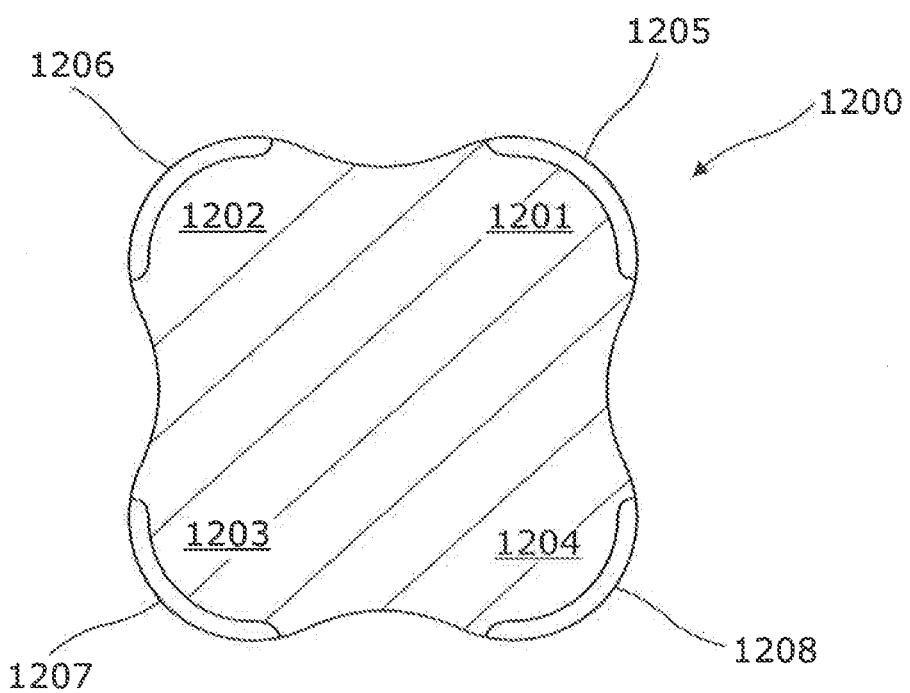
FIG. 12 herein shows in cutaway view along a main length axis, a fourth baling strip according to a fourth specific embodiment.

Referring to FIG. 12 herein, there is illustrated schematically in cutaway view in a direction viewed along a main length axis, a fourth baling strap according to fourth specific embodiment.

In cross-sectional view, the fourth baling strip thousand 200 has a substantially four leaf clover shaped perimeter consisting of first to fourth substantially circular cylindrical surface portions 1201-1204, the external perimeter being substantially symmetrical, and fitting within the four sides of a square.

On each of four shoulders, running along a main length of the strip, there is provided a corresponding respective set of undulations 1205-1208, which are presented outwardly so that it is difficult or impossible for the strip to contact itself when wrapped around itself, without the shoulders of one length part of the strip engaging with the shoulders of another part of the length of the strip, when the strip is wrapped around itself and/or formed into a knot.

Figure 13:
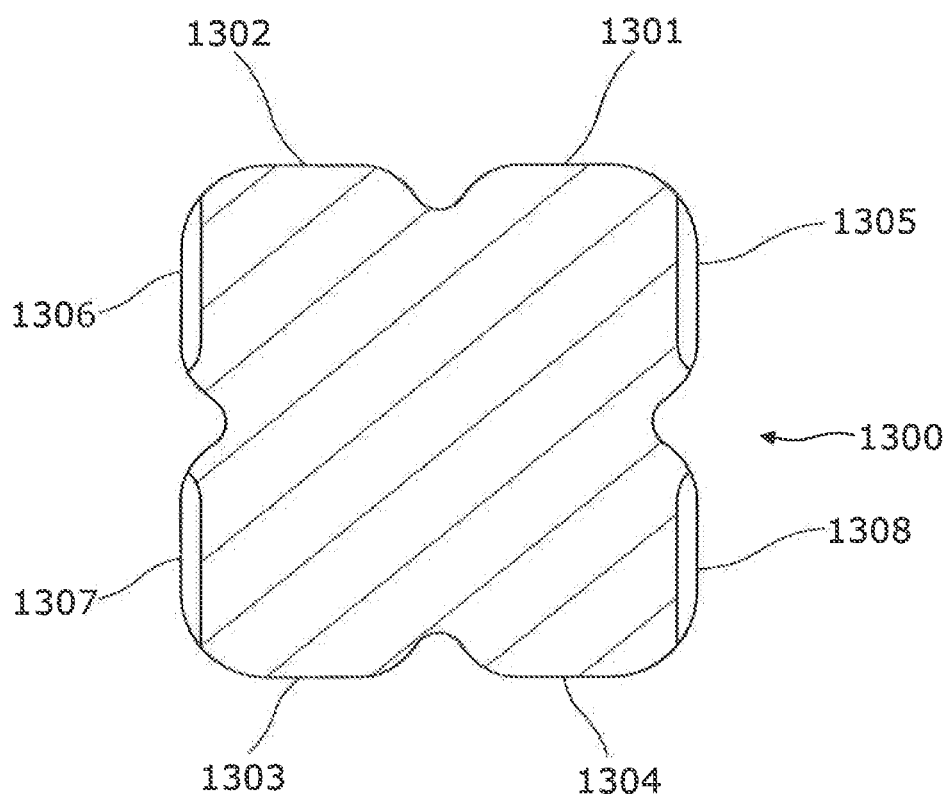
FIG. 13 herein shows in cutaway view along a main length axis, a fifth baling strip according to a fifth specific embodiment.

Referring to FIG. 13 herein, there is illustrated schematically in cutaway view in a direction viewed along a main length axis, a fifth baling strip 1300 according to a fifth specific embodiment.

In profile view, the fifth baling strip 1300 comprises a substantially square outer perimeter having first to fourth shoulder portions 1301-1304, and on each shoulder portion is formed along a main length of the elongate strip, a corresponding respective set of undulations 1305-1308. As described herein before, each set of undulations comprises a set of alternating protrusions and recesses, for example alternating ridges and valleys, ribs and troughs or the like, extending in a general direction around the circumference or perimeter of the elongate strip and repeating periodically along a main length of the strip.

In the specific fifth embodiment shown, a first set of ridges and valleys 1305 lies on a same side as a fourth set of ridges and valleys 1308, and the second set of ridges and valleys 1306 lies on the same side of the strip as the third set of ridges and valleys 1307, so that the first and fourth sets of ridges and valleys 1305, 1308 face outwardly in opposite directions and on opposite sides of the elongate strip to the second and third sets of ridges and valleys 1306, 1307.

In the general case, several geometries for positioning of series of undulations along the length of the strip are possible. In further embodiments, sets of ridges and valleys may be formed in a helical pattern on the outer surface of a main solid elongate body, in either an anticlockwise or clockwise twist along a length of the strap. In the general case, the basic primary shape of the main body of the strap may be circular, square, rectangular, elliptical, or clover leaf shaped. The number of separate sets of undulations separated from each other around a main perimeter of the elongate strip may range from 2 to 8 sets. The sets may be spaced angularly either regularly/equidistantly around the perimeter of the elongate strip, or may be positioned irregularly/non-symmetrically around the perimeter of the strip when viewed in a direction along a main length axis of the elongate body.

In the best mode embodiments, preferably the elongate band has the following physical characteristics:

Material: thermoplastic, preferably a material selected from the set polypropylene; poly acrylonitrile; short fibre reinforced polymer; polyethylene terephthalate.

Modulus of elasticity (Young's modulus): 2 to 2.7 GPa ($10^9$ N/m$^2$).

Ultimate tensile strength: 45 MPa to 55 MPa ($10^6$ N/m2)

Figure 14:
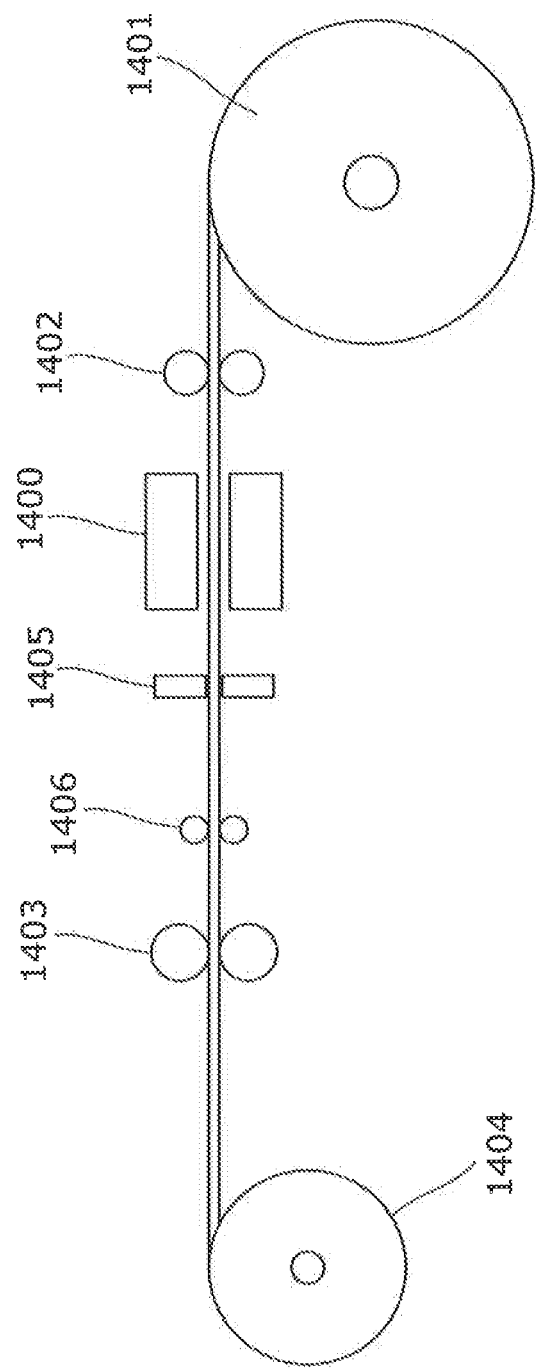
FIG. 14 herein shows in schematic view and apparatus for manufacture of a novel baling strip as disclosed herein.

Referring to FIG. 14 herein, there is illustrated schematically an apparatus for manufacture of the baling strap embodiments disclosed herein. The apparatus comprises a heating chamber 1400 for heating a band of thermoplastic cable supplied on a roller or drum 1401; a first set of guide rollers 1402 which may be either driven or non-driven, for guiding the thermoplastic cable to the heating chamber 1400; a second set of guide rollers 1403 which may be driven or non-driven for guiding the extruded strip onto a storage reel 1404; an extrusion die 1405 through which the heated thermoplastic cable is extruded, the extrusion die having an aperture shape formed to match the general cross-sectional shape of the baling strip; a set of impression rollers 1406 for impressing the sets of undulations on to the extruded elongate strip as it issues out of the die.

The whole extrusion apparatus may be computer controlled as is known in the art. The individual extrusion die 1405 may be substituted for a different die having a different aperture shape, in order to produce an extruded strip having a different overall shape, using the same apparatus.

The sets of undulations on the extruded strip correspond with the undulations formed on the impression rollers 1406 which apply those undulations to the heated extruded strip. A first set of impression rollers having a first undulation pattern may be swapped for other sets of impression rollers, in order to vary the undulation pattern applied to the external surface of the extruded strip.

The baling straps may be supplied in the form of a long length of extruded strip on a storage reel 1404. The extruded strip may be cut into predetermined lengths to form individual straps by a baling machine at the time of producing bales. The ends of the individual straps may be tied into knots at the time of baling, by a mechanism on the baling machine.

In alternative baling strap embodiments, the undulations when viewed perpendicular to the outer surface of the strap, the ridges need not be straight rib shaped undulations, but may comprise, for example chevron-shaped ridges, arrowhead-shaped ridges; curved ridges; "S" shaped ridges; "C" shaped ridges, or the like.

Each of the above embodiments may be modified to result in yet further embodiments in which the undulations may comprise discrete protrusions, for example in the form of hemispherical mounds, 3-sided or 4-sided pyramid protrusions, cubic protrusions, mesa shaped protrusions or upright cylindrical pillars. The protrusions may be arranged in rows and columns and may be spaced apart either at regular or irregular intervals.

In yet further variations of the above embodiments, undulations of different shapes may be combined in the same strip. For example a set of ribs/troughs may appear on one side of an elongate body, with a set of upstanding protrusions in the form of mounds or, for example pyramids may appear in a line elsewhere along the outer surface of the elongate strip. In the general case, the different types of protrusions may be mixed on the same elongate strip.

Further, the disclosed teaching includes an elongate baling strip having any cross-sectional shape disclosed herein in combination with any shape of undulation as disclosed herein.

In a further variation, applicable to any of the embodiments having ridges disclosed herein, the elongate ridges may themselves have notches along their lengths, so that along a main length direction of each ridge, the ridge has a saw-tooth like profile, to provide enhanced gripping.

Each of the above embodiments disclosed may be manufactured by extruding a length of thermoplastic material from a suitably shaped die head, and passing the elongate extrusion through a set of opposing rollers to impress on the surface of the extrusion the sets of undulations as described herein. Twisting of the strip under tension as the strip is formed through the extrusion die and as it passes through the opposing sets of rollers impressed with the undulation pattern, may be applied in order to provide helically extending lines of undulations along the length of the baling strip.

In a best mode embodiment, the thermoplastic material, for example polyethylene terephthalate, is coloured using carbon black. However in other embodiments, the thermoplastic material can be colourless, or can be coloured by addition of coloured additives in a range of different colours to give a range of colours.

The flexibility of the extruded baling strip, and therefore the ease in which the straps may be formed into knots, may be varied within limits by varying the tension under which the extruded strip is pulled out of the die at the time of manufacture.

The novel straps disclosed herein are also suitable for binding bales of other types of waste material, for example solid recovered fuel (SRF), municipal solid waste (MSW), old corrugated containers (OCC), plastics, polyethylene terephthalate (PET), high-density polyethylene (HOPE), shredded paper, aluminium cans, steel cans, and other recoverable materials.

Advantages provided by the embodiments described herein may include:
- Because the baling straps can be incinerated along with the whole RDF bale, there is no need to break up the bales before incineration. Consequently, the handling process of RDF bales from arrival at a power station up to feeding into an incinerator can be fully automated, thereby reducing labour costs and maintaining productivity.
- Pre-packed RDF bales can be prepared having a standardised weight and dimensions within predefined tolerances, and because these are wrapped up in plastic material for protection against the elements and do not need to be broken up before incineration, this means that the moisture content is stable, and consequently the burn rate of incinerators can be better controlled by automating control equipment which feeds the bales into an incinerator at a controlled rate.
- Since the bales are plastic wrapped from the point of baling, all the way through to incineration, the step of expanding the RDF in an open yard which may be open to the elements is omitted. This means there is one less handling stage needed, improving handling efficiency and reducing cost.
- The bales can be fed in directly to an incinerator, and since the bales all have (within tolerances) a predictable weight and calorific value, the burn rate of the incinerator can be better controlled.
- The need for covered/indoor handling areas for breaking open bales of RDF without introducing rain moisture to the RDF is alleviated, reducing premises costs.
- There is no need to collect the waste metal strap material produced when the prior art metal straps are cut immediately prior to feeding the bales into an incinerator.

The invention claimed is:

1. A non-metallic, extruded thermoplastic baling strap comprising:
   a single length of flexible elongate strap of thermoplastic material comprising an elongate body having upper and lower surfaces each occupying an upper and a lower plane, respectively, said upper and lower planes being arranged in parallel to each other;
   said single length of flexible elongate strap having first and second surfaces which are angled with respect to said upper and lower planes;
   and a smooth outer surface extending along the length of the strap located between said first and second angled surfaces;
   said first and second angled surfaces comprising a plurality of surface undulations;
   said plurality of surface undulations being arranged around and surrounding the main center line of the elongate body of the elongate strap and providing said elongate strap with a gripping surface;
   said plurality of surface undulations on the surface of a first part of the baling strap providing a gripping surface which engages with the surface undulations on the second surface of the baling strap, such that the strap is self-locking.

2. The thermoplastic strap as claimed in claim 1, comprising:
   a first set of surface undulations extending along the first surface of said elongate strap;
   a second set of surface undulations extending along the second surface of said elongate strap;
   wherein said first and second surfaces are on opposite sides of said elongate strap.

3. The thermoplastic strap as claimed in claim 1, comprising:
   a first set of surface undulations extending along a the first surface of said elongate strap;
   a second set of surface undulations extending along a the second surface of said elongate strap;
   said first and second sets of surface undulations being spaced apart from each other around a circumference of said elongate strap.

4. The thermoplastic strap as claimed in claim 1, wherein said surface undulations comprise ribbed undulations extending in a direction transverse to a main length of said elongate strap.

5. The thermoplastic strap as claimed in claim 1, wherein said strap is self- locking with itself to form a knot.

6. The thermoplastic strap as claimed in claim 1, wherein said plurality of surface undulations of one part of said strap operate in use to grip a surface of another part of said strap, or part of another strap, when said strap is knotted with itself, or with said part of another strap.

7. The thermoplastic strap as claimed in claim 1, wherein said plurality of undulations comprise a plurality of recessed portions and a plurality of protruding portions.

8. The thermoplastic strap as claimed in claim 1, wherein said undulations comprise a plurality of alternating ridges and valleys.

9. The thermoplastic strap as claimed in claim 1, wherein said undulations comprise a plurality of alternating ridges and valleys, each said ridge having a shape along its main length portion selected from the set:
   straight line;
   "V" shape;
   chevron shape;
   "S" shape;
   "C" shape;
   curved.

10. The thermoplastic strap as claimed in claim 1, wherein the undulations repeat at a distance in the range 0.83 to 1.25 undulations per millimeter of length of said elongate strap.

11. The thermoplastic strap as claimed in claim 1, wherein said plurality of surface undulations comprise a plurality of raised protrusions.

12. The thermoplastic strap as claimed in claim 1, wherein said plurality of surface undulations comprise a plurality of raised protrusions of a form selected from the set
   hemispheres;
   pillows;
   pyramids.

13. The thermoplastic strap as claimed in claim 1, comprising a synthetic thermoplastic.

14. The thermoplastic strap as claimed in claim 1, comprising a material selected from the set:
Polypropylene;
Polyacrylonitrile.

15. The thermoplastic strap as claimed in claim 1, comprising a short fibre reinforced polymer.

16. The thermoplastic strap as claimed in claim 1, comprising polyethylene terephthalate.

17. The thermoplastic strap as claimed in claim 1, wherein said undulations are arranged in at least one set of undulations extending in a helical path on the outer surface of said elongate strap.

18. The thermoplastic strap as claimed in claim 1, wherein said undulations comprise a plurality of ribs.

19. An apparatus for manufacture of a non-metallic, extruded thermoplastic baling strap, said strap comprising:
   a single length of flexible elongate strap of thermoplastic material comprising an elongate body having upper and lower surfaces each occupying an upper and lower plane, respectively, said upper and lower planes being arranged in parallel to each other;
   said single length of flexible elongate strap having first and second surfaces which are angled with respect to said upper and lower planes;
   and a smooth outer surface extending along the length of the strap located between said first and second angled surfaces;
   said first and second angled surface comprising a plurality of surface undulations;
   said plurality of surface undulations being arranged around and surrounding the main center line of the elongate body of the elongate strap and providing said elongate strap with a gripping surface, said plurality of surface undulations on the surface of a first part of the baling strap providing a gripping surface which engages with the surface undulations on the second surface of the baling strap, such that the strap is self-locking;
   said apparatus comprising:
   a feed roller for holding a supply of thermoplastic cable;
   a heating chamber for heating said thermoplastic cable;
   an extrusion die for extruding said thermoplastic cable into an extruded strip;
   a set of one or more rollers having a set of surface impressions corresponding to the plurality of undulations, for applying a set of undulations to an outer surface of said extruded strip, when said extruded strip passes said one or more rollers.

20. An extruded baling strap manufactured by using the apparatus of claim 19 herein.

21. A method of manufacture of a non-metallic, extruded thermoplastic baling strap comprising:
   a single length of flexible elongate strap of thermoplastic material comprising an elongate body having upper and lower surfaces each occupying an upper and lower plane, respectively, said upper and lower planes being arranged in parallel to each other;
   said single length of flexible elongate strap having first and second surfaces which are angled with respect to said upper and lower planes;
   and a smooth outer surface extending along the length of the strap located between said first and second angled surfaces;
   said first and second angled surface comprising a plurality of surface undulations;
   said plurality of surface undulations being arranged around and surrounding the main center line of the elongate body of the elongate strap and providing said elongate strap with a gripping surface;
   said plurality of surface undulations on the surface of a first part of the baling strap providing a gripping surface which engages with the surface undulations on the second surface of the baling strap, such that the strap is self-locking; and
   said method comprising:
   extruding an elongate strap of said thermoplastic material;
   passing said extruded elongate strap, through a set of rollers, said rollers having a surface comprising a plurality of opposite undulations corresponding to the undulations of said elongate strap, so as to impress on said elongate strap said plurality of surface undulations when said elongate strap is passed through said set of rollers.

22. An extruded baling strap manufactured according to the method of claim 21 herein.

* * * * *